US012759202B2

(12) United States Patent
Hsiao et al.

(10) Patent No.: US 12,759,202 B2
(45) Date of Patent: Oct. 13, 2026

(54) METHOD FOR MOLDING COMPOSITE COMPONENT

(71) Applicant: GIANT GLORY INTERNATIONAL LIMITED, Apia (WS)

(72) Inventors: Cheng-Ping Hsiao, Changzhi Township (TW); Yi-Feng Huang, New Taipei City (TW)

(73) Assignee: GIANT GLORY INTERNATIONAL LIMITED, Apia (WS)

( * ) Notice: Subject to any disclaimer, the term of this patent is extended or adjusted under 35 U.S.C. 154(b) by 280 days.

(21) Appl. No.: 18/420,529

(22) Filed: Jan. 23, 2024

(65) Prior Publication Data

US 2025/0010528 A1 Jan. 9, 2025

(30) Foreign Application Priority Data

Jul. 7, 2023 (TW) ................................ 112125480

(51) Int. Cl.

| | |
|---|---|
| ***B29C 45/14*** | (2006.01) |
| ***B29C 45/00*** | (2006.01) |
| ***B29C 45/26*** | (2006.01) |
| ***B29C 45/27*** | (2006.01) |
| ***B29C 45/64*** | (2006.01) |

(52) U.S. Cl.

CPC ...... *B29C 45/1418* (2013.01); *B29C 45/0055* (2013.01); *B29C 45/2602* (2013.01); *B29C 45/2701* (2013.01); *B29C 45/64* (2013.01); *B29C 2045/0058* (2013.01); *B29C 2793/009* (2013.01)

(58) Field of Classification Search

CPC ............ B29C 45/1418; B29C 45/0055; B29C 45/2602; B29C 45/56; B29C 45/64; B29C 45/2701; B29C 2045/0058; B29C 2045/14155; B29C 2045/0089; B29C 2045/5615

See application file for complete search history.

(56) References Cited

U.S. PATENT DOCUMENTS

| | | | | |
|---|---|---|---|---|
| 8,033,807 | B2 * | 10/2011 | Atake | B29C 45/14016 264/266 |
| 2012/0228808 | A1 * | 9/2012 | Tsai | B29C 45/1418 264/510 |
| 2022/0305597 | A1 * | 9/2022 | Thompson | B29C 66/72 |
| 2022/0371287 | A1 * | 11/2022 | Hsiao | B29C 45/1418 |

* cited by examiner

*Primary Examiner* — Thu Khanh T. Nguyen
(74) *Attorney, Agent, or Firm* — HSML P.C.

(57) ABSTRACT

A method for molding a composite component, which includes step (a) of providing a forming mold and a preformed substrate, in which the forming mold includes a lower mold and an upper mold matched with each other; step (b) of disposing the preformed substrate into an accommodating space, and clamping the upper mold against the lower mold such that a mold cavity is formed between the preformed substrate and the upper mold; step (c) of injecting a polymer material into the mold cavity from a sprue of the upper mold under an injecting pressure, while pushing the preformed substrate by the polymer material which is formed by the injecting pressure, thereby forming a first deformed portion; and step (d) of further clamping the upper mold against the lower mold using a molding pressure, while pushing the polymer material and the first deformed portion, thereby obtaining a semi-finished product.

12 Claims, 3 Drawing Sheets

METHOD FOR MOLDING COMPOSITE COMPONENT

CROSS-REFERENCE TO RELATED APPLICATION

This application claims priority to Taiwanese Invention Patent Application No. 112125480, filed on Jul. 7, 2023, which is incorporated by reference herein in its entirety.

FIELD

The disclosure relates to a method for molding a composite component.

BACKGROUND

Referring to FIG. 1, a conventional method for forming a composite component having a predetermined shape is generally conducted by way of molding utilizing a forming mold 100. The composite component may be a metal-polymer composite component 1 that includes a metal sheet 11 having a predetermined shape and an arc-shaped side portion 111, and a polymer layer 12 covering a surface of the metal sheet 11 and made of a polymer material 102. The forming mold 100 includes a lower mold 100A and an upper mold 100B. The upper mold 100B has a sprue, and the lower mold 100A has a secondary forming portion 101 that is formed at an inner side surface of the lower mold 100A adjacent to an inner bottom surface thereof and that is recessed outwardly with respect to the inner side surface.

As shown in FIG. 1, the conventional method is described as follows. First, a flat metal sheet 10 is placed upon an opening region of the lower mold 100A, and then the upper mold 100B and the lower mold 100A are clamped and compressed against each other so that the flat metal sheet 10 is forced into an inner space of the lower mold 100A and formed into a preformed substrate 10A with a side portion having a profile similar to a profile of the inner side surface of the lower mold 100A. Thereafter, the polymer material 102 is injected through the sprue onto a surface of the preformed substrate 10A, which has the side portion located in the inner space of the lower mold 100A, and pressure generated by injection of the polymer material 102 into the forming mold 100 is meanwhile used to push and squeeze the preformed substrate 10A so that the preformed substrate 10A may further be deformed along with a profile of the secondary forming portion 101 and hence formed into a shape corresponding thereto, thereby forming the arc-shaped side portion 111. Thus, a semi-finished metal-polymer composite component 1A is obtained. Finally, the semi-finished metal-polymer composite component 1A is subjected to a surface treatment (i.e., a post-processing process) using a technique such as, computer numerical control (CNC) machining, anodizing, spray painting, or electroplating, thereby obtaining the metal-polymer composite component 1 with the curved metal sheet 11 having the arc-shaped side portion 111.

Accordingly, it can be seen from the above description that the formation of the arc-shaped side portion 111 of the curved metal sheet 11 of the metal-polymer composite component 1 is completed solely by means of supplying the pressure produced by injection of the polymer material 102. However, such operation of forming the arc-shaped side portion 111 in one step, i.e., by pressing and stretching the preformed substrate 10A using the aforesaid pressure, is prone to producing cracks due to excessive deformation.

SUMMARY

Therefore, an object of the disclosure is to provide a method for molding a composite component that can alleviate at least one of the drawbacks of the prior art.

According to the disclosure, the method for molding the composite component includes steps (a) to (d). Step (a) of the method involves providing a forming mold and a preformed substrate. The forming mold includes a lower mold and an upper mold matched with each other. The lower mold has an inner sidewall surface and an inner lower surface connected to the inner sidewall surface, and the inner sidewall surface and the inner lower surface cooperatively define an accommodating space that accommodates the preformed substrate. In addition, the inner sidewall surface has a shaping portion adjacent to the inner lower surface and recessed inwardly into the lower mold. The upper mold has a sprue spatially communicating with the accommodating space. The preformed substrate is a curved sheet, and has a sidewall portion and a bottom portion. The sidewall portion has a height not smaller than a height of the inner sidewall surface, and is parallel to the inner sidewall surface. The bottom portion is connected to the sidewall portion and parallel to the inner lower surface of the lower mold.

Step (b) of the method involves disposing the preformed substrate into the accommodating space, and clamping the upper mold against the lower mold such that an abutment surface of the upper mold faces toward but not in contact with an abutment surface of the lower mold, thereby forming a gap therebetween, that a mold cavity is formed between the preformed substrate and the upper mold, and that a shaping space is formed between the sidewall portion of the preformed substrate and the shaping portion of the inner sidewall surface of the lower mold.

Step (c) of the method involves injecting a polymer material into the mold cavity from the sprue using an injecting pressure, while pushing the preformed substrate by the polymer material which is injected by the injecting pressure, so that the sidewall portion of the preformed substrate is pressed into the shaping space, thereby forming a first deformed portion.

Step (d) of the method involves further clamping the upper mold against the lower mold using a molding pressure such that the abutment surface of the upper mold and the abutment surface of the lower mold are brought into a tight contact with each other, while pushing the polymer material and the first deformed portion into the shaping space using the molding pressure to deform the first deformed portion into a second deformation portion, thereby obtaining a semi-finished product having a shaped substrate formed from the preformed substrate and a polymer structure formed from the polymer material and covering a surface of the shaped substrate.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
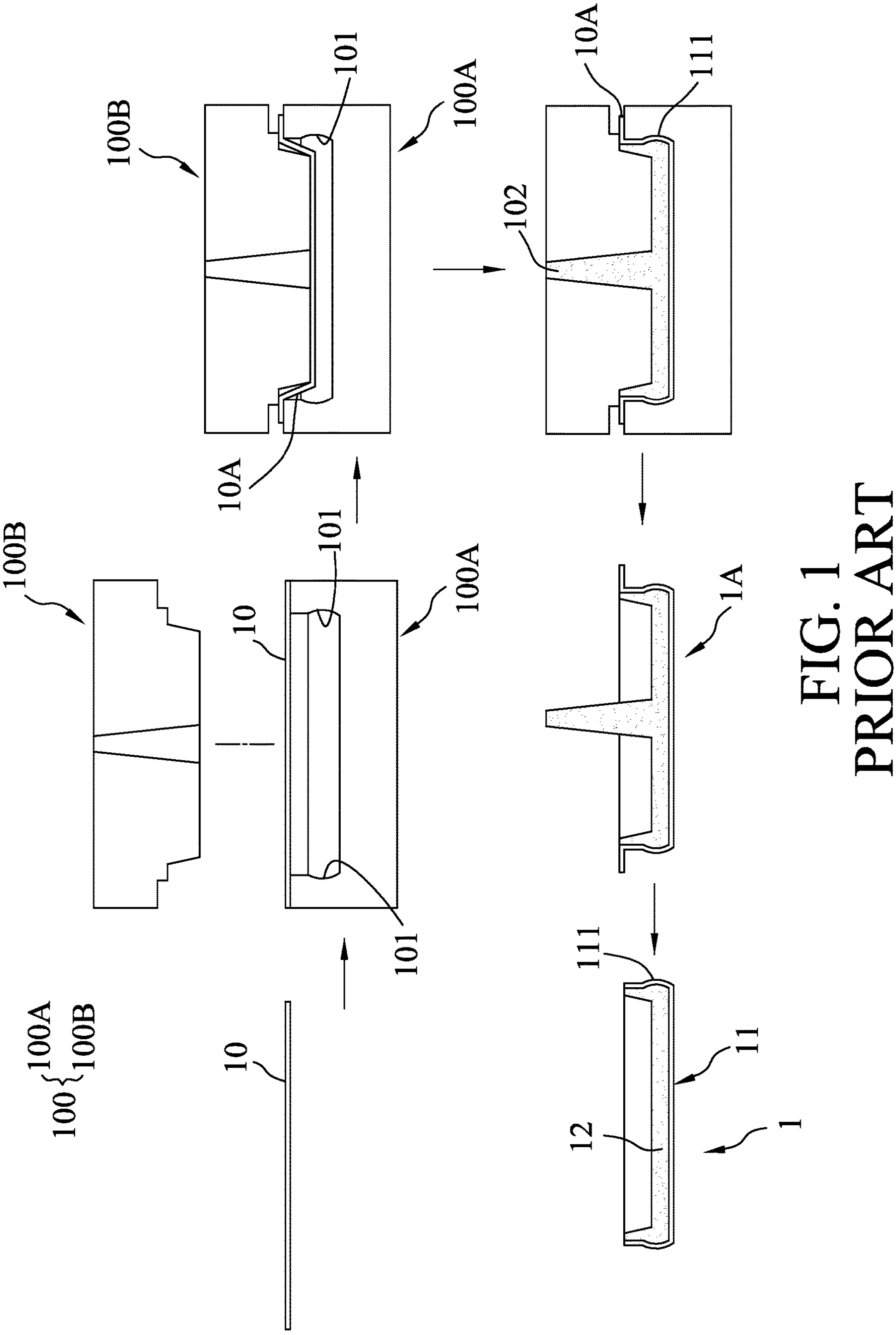
FIG. 1 PRIOR ART
FIG. 1 is a schematic diagram illustrating a conventional method for forming a composite component.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as “top,” “bottom,” “upper,” “lower,” “on,” “above,” “over,” “downwardly,” “upwardly” and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
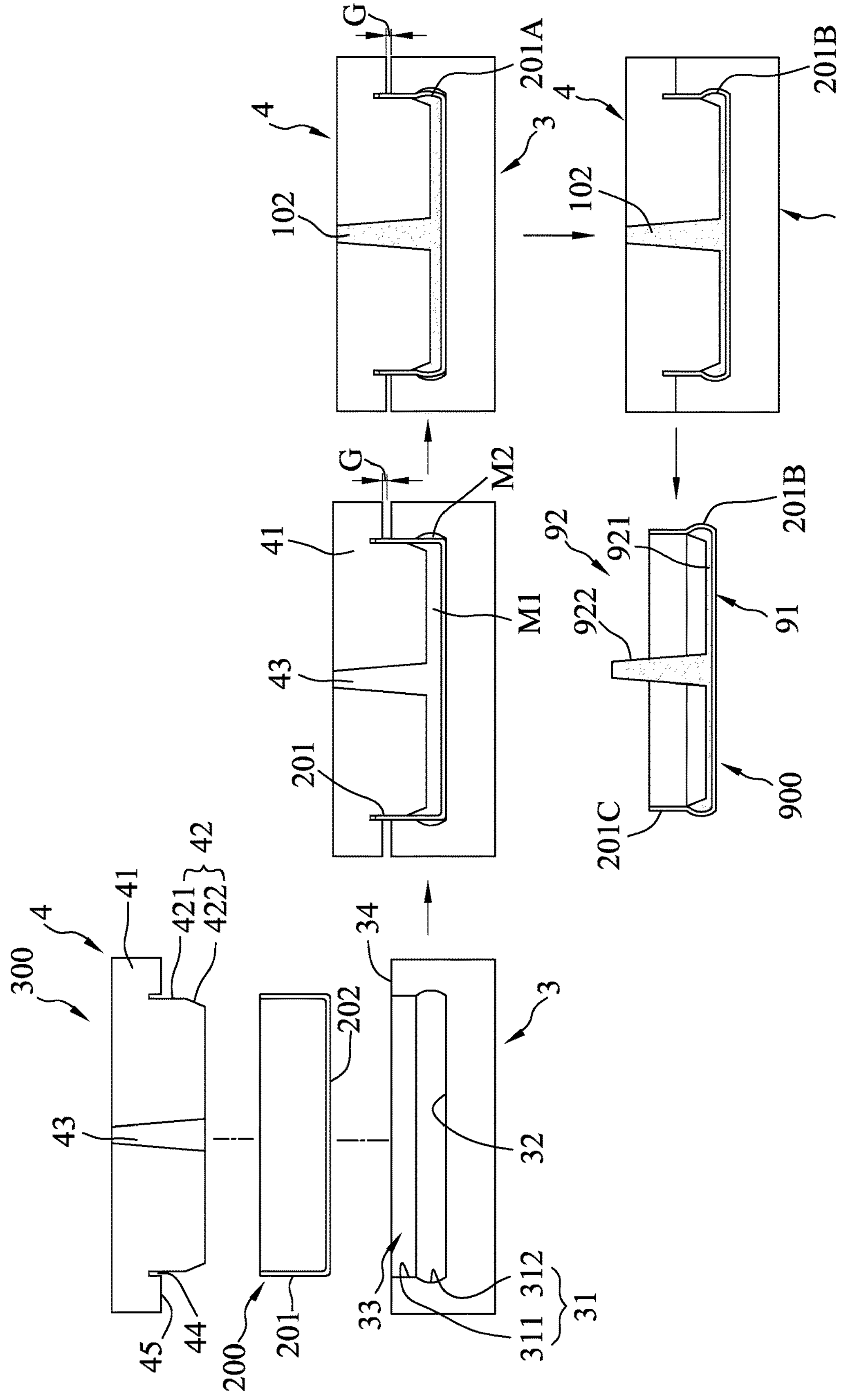
FIG. 2 is a schematic diagram illustrating an embodiment of a method for molding a composite component according to the disclosure.
Figure 3:
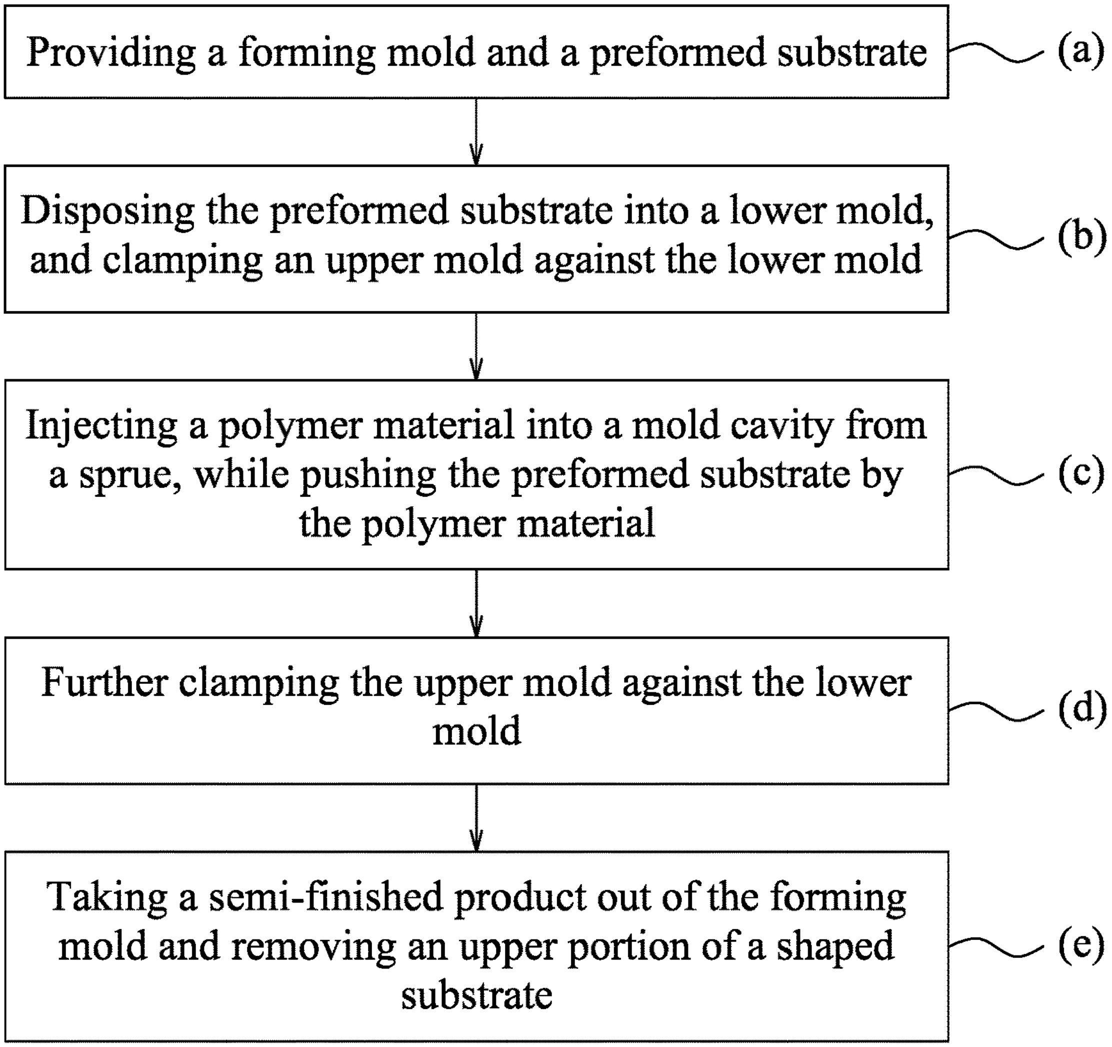
FIG. 3 is a flowchart illustrating another embodiment of the method for molding the composite component according to the disclosure.

Referring to FIGS. 2 to 3, an embodiment of a method for molding a composite component according to the disclosure includes steps (a) to (d). In certain embodiments, the method may further include step (e). The composite component may be a metal-polymer composite component First, in step (a), a forming mold 300 and a preformed substrate 200 are provided.

The forming mold 300 includes a lower mold 3 and an upper mold 4 matched with each other.

Specifically, the lower mold 3 has an inner sidewall surface 31 and an inner lower surface 32 connected to the inner sidewall surface 31, and the inner sidewall surface 31 and the inner lower surface 32 cooperatively define an accommodating space 33 for accommodating the preformed substrate 200. The inner sidewall surface 31 has a shaping portion 312 adjacent to the inner lower surface 32 and recessed inwardly into the lower mold 3. In certain embodiments, the inner sidewall surface 31 of the lower mold 3 further includes an upper sidewall portion 311, and the shaping portion 312 is disposed between the upper sidewall portion 311 and the inner lower surface 32.

The upper mold 4 has a sprue 43 spatially communicating with the accommodating space 33. The sprue 43 may penetrate two opposite surfaces of the upper mold 4, and also be located in and extend through the extension portion 42 thereof. In some embodiments, the upper mold 4 includes a cover portion 41 configured to cover the lower mold 3, and an extension portion 42 extending from the cover portion 41. In still some embodiments, the upper mold 4 further includes an annular groove 44 extending from an abutment surface 45 of the cover portion 41 into the cover portion 41 and surrounding the extension portion 42. The annular groove 44 may have a width not smaller than a thickness of the preformed substrate 200. In some embodiments, the extension portion 42 includes a parallel section 421 that has an outer surface parallel to the upper sidewall portion 311 of the inner sidewall surface 31, and a tapered section 422 extending and tapered from the parallel section 421.

The preformed substrate 200 may be made of a material, such as a metal or an alloy, and may be obtained by shaping (e.g. using a stamping method) a flat substrate (no shown) into a desired shape that has an appearance and a size corresponding to and substantially the same as those of the accommodating space 33 of the lower mold 3. To be more specific, the preformed substrate 200 is a curved sheet, and has a sidewall portion 201 and a bottom portion 202. The sidewall portion 201 may have a height not smaller than a height of the inner sidewall surface 31, and is parallel to the inner sidewall surface 31 of the lower mold 3. The bottom portion 202 may be parallel to the inner lower surface 32 of the lower mold 3.

In this embodiment, the preformed substrate 200 has a smooth surface, and the height of the sidewall portion 201 thereof is greater than the height of the inner sidewall surface 31 of the lower mold 3 so that, when the preformed substrate 200 is disposed in the lower mold 3, the preformed substrate 200 has a protruding portion which protrudes from the lower mold 3 and has a protruding height. The annular groove 44 of the upper mold 4 is configured to receive the sidewall portion 201 of the preformed substrate 200 during clamping of the upper mold 4 against the lower mold 3 in step (b) and in step (d). In this embodiment, the annular groove 44 has a depth not smaller than the protruding height.

Figure 4:
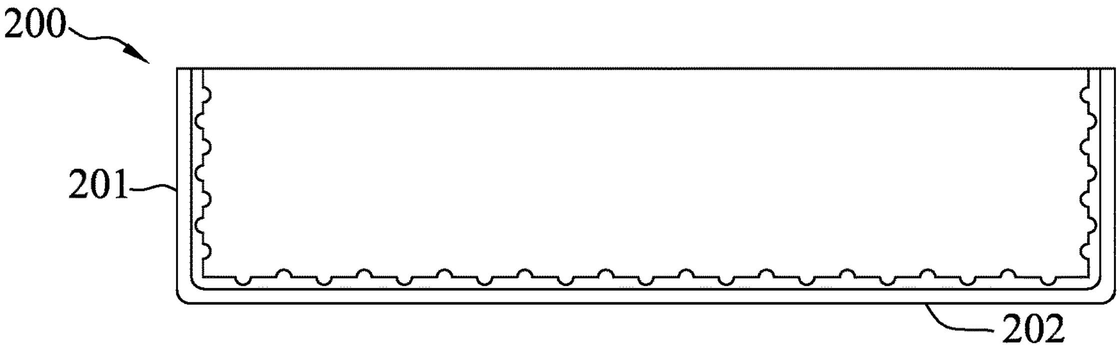
FIG. 4 is a schematic view illustrating a microstructure on a surface of a preformed substrate.

In other embodiments, as shown in FIG. 4, the preformed substrate 200 may have a microstructure on a surface thereof, and the preformed substrate 200 may be disposed into the accommodating space 33 with the microstructure facing toward the upper mold 4. The microstructure may enhance the adhesion between the preformed substrate 200 and a polymer structure 92 (to be described later), thereby strengthening bonding therebetween.

Thereafter, in step (b), the preformed substrate 200 is disposed into the accommodating space 33 of the lower mold 3, and the upper mold 4 is clamped against the lower mold 3 such that the abutment surface 45 of the cover portion 41 of the upper mold 4 faces toward but not in contact with an abutment surface 34 of the lower mold 3, thereby forming a gap (G) between the abutment surface 45 of the cover portion 41 and the abutment surface 34 of the lower mold 3, such that a mold cavity (M1) is formed between the preformed substrate 200 and the upper mold 4, and such that a shaping space (M2) is formed between the sidewall portion 201 of the preformed substrate 200 and the shaping portion 312 of the inner sidewall surface 31 of the lower mold 3.

Specifically, in this step, during the clamping of the upper mold 4 against the lower mold 3, the extension portion 42 of the upper mold 4 enters the accommodating space 33, the sidewall portion 201 of the preformed substrate 200 and the parallel section 421 of the extension portion 42 are brought to a close contact with each other, and the sidewall portion 201 of the preformed substrate 200 and the upper sidewall portion 311 of the inner sidewall surface 31 of the lower mold 3 are brought to a close contact with each other, i.e., the parallel section 421 of the extension portion 42 and the upper sidewall portion 311 of the inner sidewall surface 31 tightly sandwich the preformed substrate 200, so as to form the mold cavity (M1) and the shaping space (M2). Additionally, in this embodiment, because the height of the sidewall portion 201 of the preformed substrate 200 is greater than the height of the inner sidewall surface 31, the protruding portion that protrudes from the lower mold 3 is therefore put to enter the annular groove 44 of the upper mold 4.

Afterward, in step (c), a polymer material 102 is injected into the mold cavity (M1) from the sprue 43 using an injecting pressure, while pushing the preformed substrate 200 by the polymer material 102 which is injected by the injecting pressure, so that the sidewall portion 201 of the preformed substrate 200 is pressed into the shaping space (M2), thereby forming a first deformed portion 201A.

The polymer material 102 may be a thermoplastic resin or a thermosetting resin. In step (c), the polymer material 102 injected from the sprue 43 under the injecting pressure is in a molten state. It should be noted that the degree of the injecting pressure that allows the polymer material 102 to be injected into the lower mold 3 may vary depending on several factors, such as a viscosity of the polymer material 102, a material of the preformed substrate 200, a predetermined degree of deformation of the preformed substrate 200, and/or the time required for the polymer material 102 to fill up the mold cavity (M1). In some embodiments, the polymer material 102 is a resin having a melting point ranging from 150° C. to 300° C.; and in order to deform the preformed substrate 200, the injecting pressure for the polymer material 102 may range approximately from 100 MPa to 200 Mpa, and the time for injecting the polymer material 102 under the injecting pressure may range approximately from 10 seconds to 60 seconds. Moreover, during injection of the polymer material 102 into the lower mold 3, the forming mold 300 may meanwhile be heated.

In step (d), the upper mold 4 is further clamped against the lower mold 3 using a molding pressure after the polymer material 102 fills up the mold cavity (M1) in step (c) and after the sprue 43 is closed, such that the abutment surface 45 of the upper mold 4 and the abutment surface 34 of the lower mold 3 are brought into a tight contact with each other, i.e., to close the gap (G), while the polymer material 102 and the first deformed portion 201A are pushed into the shaping space (M2) using the molding pressure to deform the first deformed portion 201A into a second deformation portion 201B, i.e, the first deformed portion 201A is compressed and deformed into the second deformed portion 201B having a shape corresponding to that of the shaping portion 312, thereby obtaining a semi-finished product 900 having a shaped substrate 91 that is formed from the preformed substrate 200 and a polymer structure 92 that is formed from the polymer material 102 and that covers a surface of the shaped substrate 91. In step (d), the tapered section 422 of the extension portion 42 and the shaping portion 312 of the inner sidewall surface 31 correspond in position to each other. In some embodiments, the polymer structure 92 may include a base portion 921 covering the surface of the shaped substrate 91, and a protrusion portion 922 protruding from the base portion 921 and corresponding to the sprue 43 in shape and position.

In other embodiments, the method for molding the composite component according to the disclosure may further include step (e), which involves taking the semi-finished product 900 out of the forming mold 300 and removing an upper portion 201C of the shaped substrate 91 that is in contact with the upper sidewall portion 311 in step (d). Specifically, the upper portion 201C is a portion that is connected to the second deformation portion 201B and is on top thereof in step (d). In still other embodiments, the protrusion portion 922 may be removed as well. The composite component is thereby obtained.

In sum, the method according to the disclosure utilizes a two-step method (i.e., steps (c) and (d)) to respectively provide the preformed substrate 200 with the injecting pressure and the molding pressure, thereby deforming the preformed substrate 200 into the shaped substrate 91. Compared to a conventional method of deforming a preformed substrate 10A as shown in FIG. 1, which suffers from excessive pressure and degree of deformation at one time due to the deformation practice by a one-step method such that crackings or the like may be generated therein, the method of the disclosure divides such excessive pressure into two lesser parts that respectively act on the preformed substrate 200 in steps (c) and (d) and therefore reduce the degree of deformation in each step, thereby enhancing yield of the composite component.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for molding a composite component, comprising steps of:

(a) providing a forming mold and a preformed substrate, the forming mold including a lower mold and an upper mold matched with each other, the lower mold having an inner sidewall surface and an inner lower surface connected to the inner sidewall surface, the inner sidewall surface and the inner lower surface cooperatively defining an accommodating space for accommodating the preformed substrate, the inner sidewall surface having a shaping portion adjacent to the inner lower surface and recessed inwardly into the lower mold, the upper mold having a sprue spatially communicating with the accommodating space, the preformed substrate being a curved sheet and having a sidewall portion and a bottom portion, the sidewall portion having a height not smaller than a height of the inner sidewall surface and being parallel to the inner sidewall surface, the bottom portion being connected to the sidewall portion and parallel to the inner lower surface of the lower mold;

(b) disposing the preformed substrate into the accommodating space, and clamping the upper mold against the lower mold such that an abutment surface of the upper mold faces toward but not in contact with an abutment surface of the lower mold, thereby forming a gap therebetween, that a mold cavity is formed between the preformed substrate and the upper mold, and that a shaping space is formed between the sidewall portion of the preformed substrate and the shaping portion of the inner sidewall surface of the lower mold;

(c) injecting a polymer material into the mold cavity from the sprue under an injecting pressure, while pushing the preformed substrate by the polymer material which is formed by the injecting pressure, so that the sidewall portion of the preformed substrate is pressed into the shaping space, thereby forming a first deformed portion; and (d) further clamping the upper mold against the lower mold using a molding pressure such that the abutment surface of the upper mold and the abutment surface of the lower mold are brought into a tight contact with each other, while pushing the polymer material and the first deformed portion into the shaping space using the molding pressure to deform the first deformed portion into a second deformation portion, thereby obtaining a semi-finished product having a shaped substrate formed from the preformed substrate and a polymer structure formed from the polymer material and covering a surface of the shaped substrate.

2. The method as claimed in claim 1, wherein the inner sidewall surface of the lower mold further includes an upper sidewall portion, the shaping portion being disposed between the upper sidewall portion and the inner lower surface.

3. The method as claimed in claim 2, further comprising step (e) of taking the semi-finished product out of the forming mold and removing an upper portion of the shaped substrate that is in contact with the upper sidewall portion in step (d).

4. The method as claimed in claim 3, wherein the upper mold includes a cover portion configured to cover the lower mold and an extension portion extending from the cover portion, during the clamping of the upper mold against the lower mold in step (b), the extension portion entering the accommodating space.

5. The method as claimed in claim 4, wherein the sprue is located in the extension portion, the polymer structure of the semi-finished product including a base portion covering the surface of the shaped substrate, and a protrusion portion protruding from the base portion and corresponding to the sprue in shape and position.

6. The method as claimed in claim 5, wherein step (e) further includes removing the protrusion portion.

7. The method as claimed in claim 4, wherein the upper mold further includes an annular groove surrounding the extension portion and configured to receive the sidewall portion of the preformed substrate during the clamping of the upper mold against the lower mold in step (b) and in step (d).

8. The method as claimed in claim 7, wherein the height of the sidewall portion of the preformed substrate is greater than the height of the inner sidewall surface of the lower mold so as to allow a protruding portion to be protruded from the lower mold in step (b) and to have a protruding height, the annular groove having a depth not smaller than the protruding height.

9. The method as claimed in claim 4, wherein the extension portion includes a parallel section that has an outer surface parallel to the upper sidewall portion of the inner sidewall surface, and a tapered section extending and tapered from the parallel section, during the clamping of the upper mold against the lower mold in step (b), the sidewall portion of the preformed substrate and the parallel section being brought to a close contact with each other, and the sidewall portion of the preformed substrate and the upper sidewall portion being brought to a close contact with each other.

10. The method as claimed in claim 9, wherein the tapered section of the extension portion of the upper mold and the shaping portion of the inner sidewall surface of the lower mold correspond in position to each other during the further clamping of the upper mold against the lower mold in step (d).

11. The method as claimed in claim 1, wherein the preformed substrate has a microstructure on a surface thereof, in step (b), the preformed substrate being disposed in the accommodating space with the microstructure facing toward the upper mold.

12. The method as claimed in claim 1, wherein in steps (b) to (d), the sidewall portion of the preformed substrate protrudes from the lower mold.

* * * * *